Figure 1:
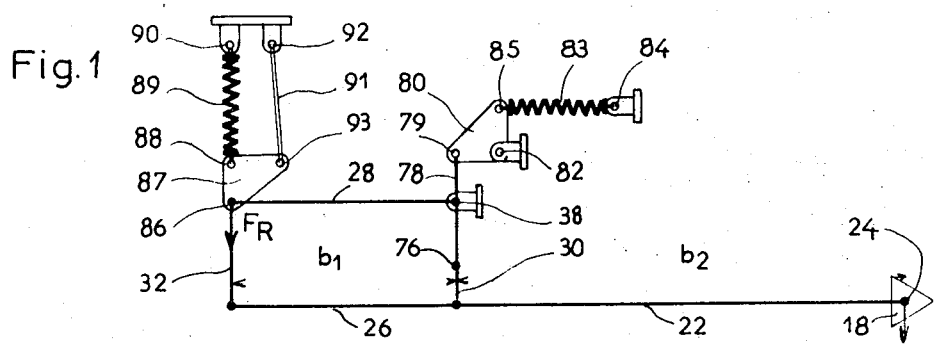

United States Patent [19]
Laurent

[11] 3,819,881
[45] June 25, 1974

[54] ARTICULATED PARALLELOGRAM SUPPORT MECHANISM FOR CONNECTING A CURRENT COLLECTING HEAD TO A HIGH SPEED VEHICLE

[75] Inventor: Daniel Laurent, Grenoble, France

[73] Assignee: Societe Dauphinoise Flectrique, Grenable, France

[22] Filed: Mar. 21, 1972

[21] Appl. No.: 236,408

[52] U.S. Cl. .................................... 191/66, 191/49
[51] Int. Cl. ............................................... B60l 5/00
[58] Field of Search ............ 191/45, 47, 48, 49, 50, 191/59, 59.1, 66, 67, 68, 69, 70

[56] References Cited
UNITED STATES PATENTS
| 747,177 | 12/1903 | Hoopes | 191/49 |
| 2,700,705 | 1/1955 | Anjesky | 191/48 |
| 3,238,314 | 3/1966 | Faiveley | 191/66 |
| 3,349,197 | 10/1967 | Scheidecker | 191/67 |
| 3,444,338 | 5/1969 | Leger | 191/66 |
| 3,712,430 | 1/1973 | Charamel | 191/45 R |

Primary Examiner—M. Henson Wood, Jr.
Assistant Examiner—D. W. Keen
Attorney, Agent, or Firm—Stevens, Davis, Miller & Mosher

[57] ABSTRACT

An articulated parallelogram mechanism for connecting a current collecting head to a high speed vehicle. Spring means maintain the collector head substantially in neutral equilibrium whatever may be the deviation of the collector head from its mean position with respect to the vehicle.

10 Claims, 4 Drawing Figures

PATENTED JUN 25 1974    3,819,881

ARTICULATED PARALLELOGRAM SUPPORT MECHANISM FOR CONNECTING A CURRENT COLLECTING HEAD TO A HIGH SPEED VEHICLE

This invention relates to a support mechanism connecting a high speed vehicle movable along a trackway to a current collecting head which is guided in a passageway defined by a plurality (generally three) of conductor rails connected to a source of electric energy such as a three phase source.

In my copending Patent Application Ser. No. 167,912 filed on Aug. 2, 1971, I have disclosed a balanced support mechanism of the kind mentioned comprising an articulated parallelogram composed of four pivotally interconnected bars. The parallelogram is pivotally connected to the vehicle and one of its bars is prolonged for pivotal connection to said collector head. Another one of the bars supports a counterweight adapted to maintain the collector head substantially in neutral static equilibrium for all lateral deviations of the collector head from its mean normal position due to small deviations of parallelism of the trackways of the vehicle and of the collector head, respectively, or resulting from lateral inertia movements of the vehicle and of the collector head. Of course the counterweight increases the total mass of the mechanism so that the dynamic behavior of the system is affected.

It is a primary object of the invention to provide a connection system in which the balancing is obtained by resilient means without calling for a counterweight. As a matter of fact, in actual practice where the trackways for high speed vehicles have curves of very great radius centrifugal balancing can be neglected permitting the utilization of simple light-weight connection mechanisms between the vehicle and its collector head.

Figure 2:
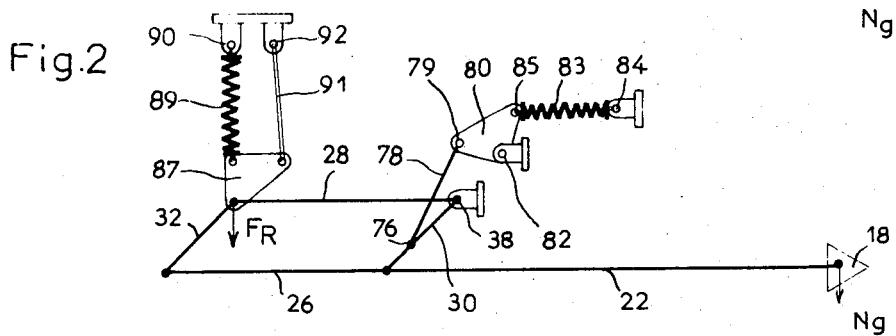
Figure 3:
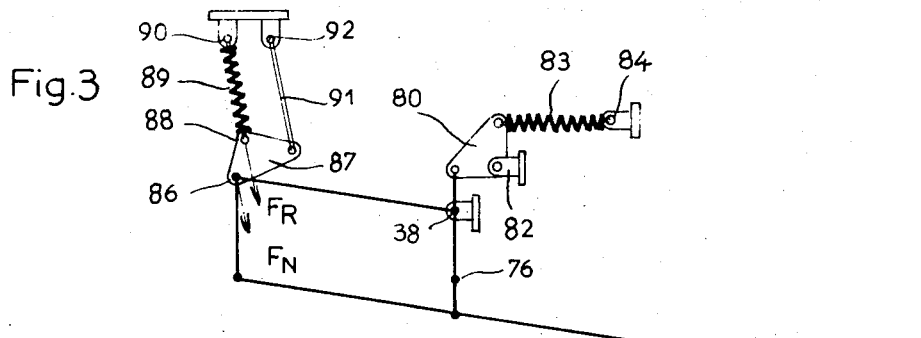
Figure 4:
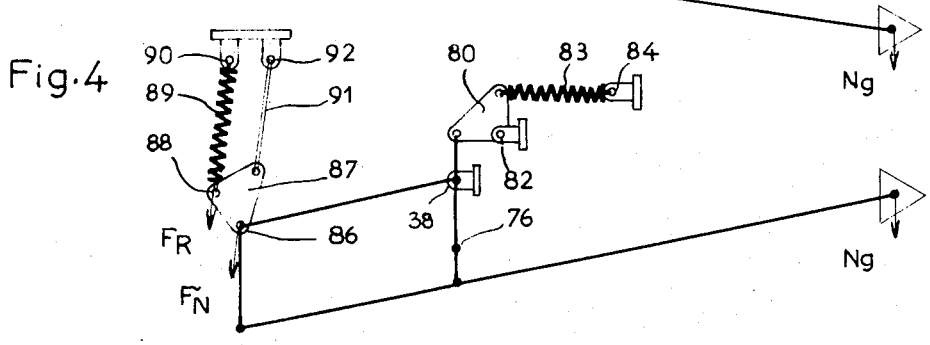

Other objects and advantages will become apparent from the following description of an embodiment of the invention shown in the annexed drawing, in which:

FIG. 1 is a schematic view in elevation of a balanced mechanism according to the invention connecting a vehicle to its collector head, the latter being shown in its mean normal operating position;

FIG. 2 to 4 correspond to FIG. 1 but show the mechanism for different positions of the collector head, the latter being shown offset horizontally to the left; vertically downwards; and vertically upwards, respectively.

In the figures, a current collector head 18 guided in a passageway (not shown) constituted by a plurality of (for example, three) current distribution conductor rails (not shown) which extend parallel to the trackway (not shown) of a vehicle (not shown) supplies electric energy to the vehicle. Reference may be had to the above mentioned Patent Application for further details which are however immaterial for a good understanding of the present invention.

A rod 22 extending perpendicularly to the longitudinal direction of the trackway of the vehicle, has one of its ends pivotally connected to the drag center, which may be the center of mass, of the collector head 18 and this connection is preferably of the ball-and-socket type so as to admit of small rotary motions of the collector head in every direction. Rod 22 is integral with a prolonged part 26 which composes with bars 28, 30 and 32 an articulated parallelogram having preferably but not necessarily a rectangular shape when collector head 18 occupies, as shown in FIG. 1, its mean normal operating position. The pivot 38 in which bars 28 and 30 are pivotally interconnected is supported by the vehicle through a bracket. A traction rod 78 has one end pivotally connected to bar 30 intermediate the ends thereof and the opposite end of bar 30 is pivotally connected to a bell crank 80 which constitutes a lever having a fulcrum 82 carried by the vehicle. A tension spring 83 has one end attached at 85 to bell-crank 80 and the other end 84 secured to the vehicle. Rod 78 is aligned with bar 30 when the collector head occupies its normal position.

The pivot 86 in which bars 28 and 32 are pivotally interconnected is carried by a second bell-crank 87. One end of a compression spring 89 is attached at 88 to bell-crank 87 and the other end is attached at 90 to a bracket which is integral with the vehicle and which comprises a second pivotally connection 92 for a guide rod 91, the opposite end of rod 91 being pivoted at 93 on bell-crank 87. To obtain maximum compensation (i.e. neutral equilibrium of the collector head in its passageway), compression spring 89 exerts a downwards directed force $F_R$ on pivot joint 86 such that $F_R \times b_1 = N_a \times b_2$ when the collector head occupies its mean operating position shown in FIG. 1, where $N_a$ equals the weight of the collector head, the weight of the different linkage elements being neglected whereas the force produced by spring 83 is absorbed by the bracket supporting pivot 38 (links 30 and 78 being aligned in this position). Preferably, springs 83 and 89 have linear characteristics, at least for positions of the mechanism near its mean normal position.

Of course, each departure of the system from its mean normal position shown in FIG. 1 can be decomposed in a pivotal movement of bar 30 about axis 38 and a pivotal movement of bar 28 about axis 38. For a better understanding of the operation of the invention both deviations will now be discussed separately.

Referring now to FIG. 2, a lateral, substantial horizontal displacement of the collector head 18 from its normal position shown in FIG. 1 causes rods 30 and 32 to turn about axes 38 and 86, respectively, whereby traction rod 78 becomes disaligned with bar 30 while axis 86 remains in place. A torque is exerted on bar 30 by tension spring 83 through bell-crank 80, which is rotated in a clockwise direction, and traction rod 78. The torque tends to compensate the action of the weight $N_a$ of collector head 18 and of the force $F_R$ so as to maintain the system in a stable way in any position occupied by collector head 18. Of course, the different parameters of the system such as the force of spring 83 and the position of axes 76, 79, 82 and 85 should be selected according to well-known mechanical laws in order to obtain a compensation of any desired degree of precision.

FIG. 3 and 4 show how compensation is produced in response to substantial vertical movement of collector head 18. In such cases, rod 78 and spring 83 are inoperative but the movement of axis 86 causes bell-crank 87 which is guided by rod 91 to rotate thereby to produce in the case of FIG. 3 an increased force $F_R$ applied by spring 89 on bell-crank 87. The active component $F_N$ of force $F_R$ applied to axis 86 is reduced by the leverage of bell-crank 87 in a manner to compensate the weight of collector head 18. Inversely, in case of upwards movement of collector head 18, $F_R$ is reduced but its active component $F_N$ is selectively increased due to the lever action of lever 87.

What is claimed is:

1. A mechanism for use with a high speed vehicle movable along a trackway to drive and support a current collecting head guided along current supply means extending parallel to said trackway, said mechanism comprising:

four bars extending in a common plane transverse of the longitudinal direction of said current supply means and pivotally interconnected to constitute an articulated parallelogram;

means to support from said vehicle a first one of the four pivot points of said parallelogram joining a first and a second one of said bars;

rod means connecting said collector head to a third one of said bars;

and resilient balance means acting between said vehicle and said articulated parallelogram to maintain said collector head substantially in neutral equilibrium for all positions of said collector head adjacent the mean normal operating position thereof.

2. A mechanism according to claim 1, said articulated parallelogram being of a substantial rectangular shape when said collector head occupies said mean position.

3. A mechanism according to claim 1, said rod means comprising a rod prolonging said third bar.

4. A mechanism according to claim 3, said first and third bars and said rod being substantially horizontal when said collector head occupies said mean position.

5. A mechanism for use with a high speed vehicle movable along a trackway to drive and support a current collecting head guided along current supply means extending parallel to said trackway, said mechanism comprising:

four bars extending in a common plane transverse of the longitudinal direction of said current supply means and pivotally interconnected to constitute an articulated parallelogram;

means to support from said vehicle a first one of the four pivot points of said parallelogram joining a first and a second one of said bars;

rod means connecting said collector head to a third one of said bars;

and resilient balance means acting between said vehicle and said articulated parallelogram to maintain said collector head substantially in neutral equilibrium for all positions of said collector head adjacent the mean normal operating position thereof, said resilient balance means comprising spring means including a first spring member acting on a second one of said pivot points and a second spring member acting on said second bar.

6. Mechanism according to claim 5, said first spring member acting on the pivot point jointing said first bar and the fourth bar of said four bars.

7. Mechanism according to claim 5, said spring members comprising linear springs acting through bellcranks on said articulated parallelogram.

8. Mechanism according to claim 5, said second spring member acting through a bell-crank on a rod pivotally connected to said second bar intermediate the ends thereof.

9. Mechanism according to claim 8, said rod being substantially aligned with said second bar when said collector head occupies said mean position.

10. A mechanism for use with a high speed vehicle movable along a trackway to drive and support a current collecting head guided along current supply means extending parallel to said trackway, said mechanism comprising:

four bars extending in a common plane transverse of the longitudinal direction of said current supply means and pivotally interconnected to constitute an articulated parallelogram structure;

a pivot axis on said vehicle pivotally supporting said articulated parallelogram structure to permit said bars to move in said plane with respect to said vehicle, one of said bars extending beyond said articulated parallelogram structure to pivotally support said collector head on the free end of said one bar; and spring means acting between said vehicle and said articulated parallelogram structure to maintain said collector head substantially in neutral equilibrium for all positions of said collector head adjacent the mean normal operating position thereof.

* * * * *